(No Model.)

E. WESTON.
ELECTRICAL MEASURING INSTRUMENT.

No. 446,491. Patented Feb. 17, 1891.

WITNESSES:
Gustave Dieterich
M. Posch

INVENTOR
Edward Weston
BY Park Benjamin
his ATTORNEY.

UNITED STATES PATENT OFFICE.

EDWARD WESTON, OF NEWARK, NEW JERSEY.

ELECTRICAL MEASURING-INSTRUMENT.

SPECIFICATION forming part of Letters Patent No. 446,491, dated February 17, 1891.

Application filed May 12, 1890. Serial No. 351,527. (No model.)

*To all whom it may concern:*

Be it known that I, EDWARD WESTON, of Newark, Essex county, New Jersey, have invented a new and useful Improvement in Electrical Measuring-Instruments, of which the following is a specification.

My invention relates to an ammeter for the measurement of the strength of alternating currents of electricity in ampères; and it consists in the construction hereinafter set forth, embodying a stationary coil, a vibrating or oscillating coil supported in the field of force of said stationary coil, a means of indicating the extent of movement or deflection of said movable coil when a current is caused to traverse said coils, and a spring opposing the motion of said vibrating coil. The two coils are electrically connected in multiple-arc circuit.

Figure 1:
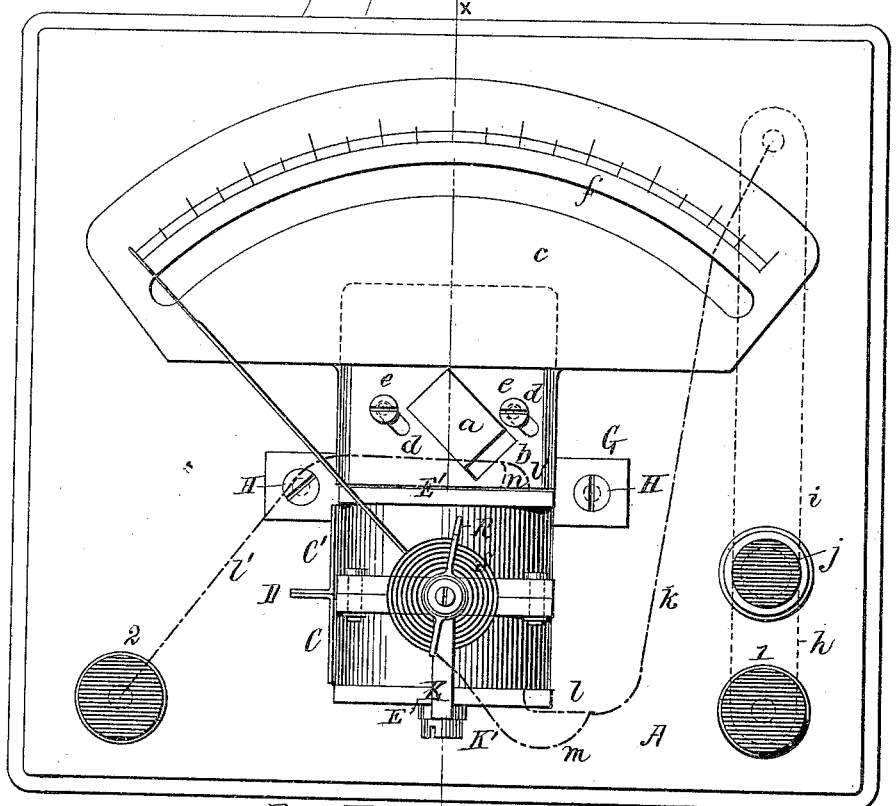
Figure 2:
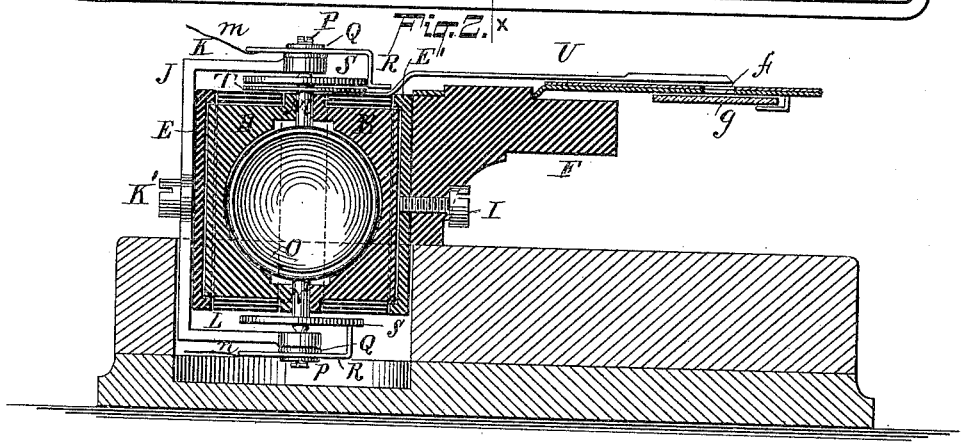

In the accompanying drawings, Figure 1 is a plan view of my new ammeter, and Fig. 2 a transverse section on the line X X of Fig. 1.

Similar letters and figures of reference indicate like parts.

A represents the base of the instrument, which is suitably hollowed out to receive the spools B. Said spools are made of hard rubber or other insulating material, and in their meeting faces are made hemispherical cavities, so that a spherical internal chamber is produced. Around each spool is wound a strip C C' of sheet-copper, and between the turns of said strip is interposed a layer of insulating material. The outer ends of the strips are soldered or otherwise fastened together, as shown at D, Fig. 1. On the outer faces of the spools B are applied flanged covers E E'.

F is a bracket, which is supported on the base A by the cross-bar G, through which pass the fastening-screws H. Passing through said bracket is a set-screw I, which enters the cover E' of the spool B, and in this way said spool is supported in place. On the opposite face or cover E of the spool is a bar J, secured to said spool by a set-screw K'. The bar J has arms K L, which serve as bearings for the pivot-pins M N of a ring O, of paper or other insulating material, which is arranged within the spherical cavity of the spools B. The ends of the pivot-pins are stepped in screws P, which are supported in the ends of the arms K L. Surrounding these screws are collars Q of insulating material, and surrounding these collars again and pivoted thereon are arms R. To the bent-over ends of said arms R are attached the extremities of coiled springs S, the inner ends of which are connected to the pivot-pins M N. The pivot-pin M carries a light disk T, to which is secured an index-needle U. On the bracket F is a projection $a$, which is received in a diagonal slot $b$ in the scale-plate $c$. Said scale-plate also has slots $d$, which receive screws $e$, entering the bracket F. The object of this arrangement is to allow the scale-plate to be adjusted on said bracket; but said arrangement forms no part of my present invention. On the scale-plate C is inscribed a scale, and in said plate is a curved slot $f$, beneath which is arranged a mirror $g$. Surrounding the ring O is a coil of fine insulated wire.

The circuits in the instrument proceed as follows: from the binding-post 1 to a spring $h$, (indicated by dotted lines, Fig. 1,) to a second contact-spring $i$, (when said springs are pushed together by the pin $j$,) to wire $k$. From the wire $k$ one branch $l$ connects to the inner end of the flat spiral coil C, whence the circuit proceeds to the junction D, and thence to the other coil C', and thence by the wire $l'$ to a binding-post 2. From the wire $k$ a shunt $m$ proceeds to the upper arm R, and upper spring S to pivot-pin M, through the coil on ring O to pivot-pin N, lower spring S, lower spring R, and so by wire $n$ to wire $l'$. The coil on the ring O and the copper strips C C' on the spools B are therefore connected in multiple arc.

In operation, when the instrument is connected in circuit, the ring O, in accordance with well-known laws, takes an angular position with respect to the axis of the spools B, and this position is indicated by the needle U on the scale and is a measure of the strength of the current, the said strength being indicated in ampères on said scale.

This instrument is designed for use more particularly with alternating currents.

I claim—

1. In an electrical measuring-instrument, a stationary coil of flat or sheet metal, a vibrating or oscillating coil on diametral pivots in the field of force of said stationary coil, a spring opposing the movement of said vibrating coil, a fixed scale, and an index or pointer actuated by said vibrating coil over said scale, said coils being electrically connected in multiple arc.

2. In an electrical measuring-instrument, the spool or bobbin B, strips C C' coiled thereon, a pivoted coil O within said spool and having its pivots extending through the walls thereof and between said strips C C', supports for said pivots, and opposed springs S, said strips and coil O being electrically connected in multiple arc.

EDWARD WESTON.

Witnesses:
R. C. FESSENDEN,
M. BOSCH.